(12) United States Patent
Kollmuss et al.

(10) Patent No.: US 9,731,916 B2
(45) Date of Patent: Aug. 15, 2017

(54) PALLETIZING DEVICE AND METHOD FOR HANDLING THEREOF

(71) Applicant: Krones AG, Neutraubling (DE)

(72) Inventors: Manuel Kollmuss, Raubling (DE); Pino-Giuseppe Palumbo, Kolbermoor/Lohholz (DE)

(73) Assignee: Krones, AG, Neutraubling (DE)

( * ) Notice: Subject to any disclaimer, the term of this patent is extended or adjusted under 35 U.S.C. 154(b) by 106 days.

(21) Appl. No.: 14/557,540

(22) Filed: Dec. 2, 2014

(65) Prior Publication Data

US 2015/0151930 A1    Jun. 4, 2015

(30) Foreign Application Priority Data

Dec. 3, 2013    (DE) .................. 10 2013 224 758

(51) Int. Cl.
*B65G 57/06*    (2006.01)
*B65G 57/02*    (2006.01)
(Continued)

(52) U.S. Cl.
CPC ............. *B65G 57/03* (2013.01); *B65G 57/06* (2013.01); *B65G 57/24* (2013.01); *B65G 65/02* (2013.01);
(Continued)

(58) Field of Classification Search
CPC ...... B65G 57/24; B65G 57/06; B65G 57/245; B65G 57/005; B65G 57/03
(Continued)

(56) References Cited

U.S. PATENT DOCUMENTS 2,956,696 A * 10/1960 Drakengren .......... B65G 57/26
414/791.8
3,342,349 A    9/1967 Sheldon et al.
(Continued)

FOREIGN PATENT DOCUMENTS

CN    201713116 U    1/2011
CN    102101593 A    6/2011
(Continued)

OTHER PUBLICATIONS

German Search Report for DE 10 2013 224 758.3 dated May 26, 2015.
(Continued)

*Primary Examiner* — Gregory Adams
(74) *Attorney, Agent, or Firm* — Dennemeyer & Associates, LLC (57) ABSTRACT

Disclosed is a palletizing device (10) with a vertically mobile transfer station (14) which is in conveying communication with upstream conveying equipment (18) for conveying items, packaged goods, packages (20), or the like, to be palletized. The transfer station (14) is followed in the conveying direction (22) by a vertically mobile loading station (16) which is in conveying communication with a stacking position (28) for palletizing the items, packaged goods, and/or packages (20). The transfer (14) and loading stations (16) which are independently adjustable in the vertical positions thereof are associated with a common support structure, having separate guide devices (30) for vertically mobile guiding and drive devices for vertical position adjustment of the transfer (14) and loading stations (16), respectively.

In addition, a method for handling such a palletizing device (10) is disclosed wherein the base planes (26, 48) of the transfer (14) and loading stations (16) are approximately
(Continued)

flush at least while a layer of items, packaged goods, and/or packages (21) is pushed over between the two stations (14, 16).

11 Claims, 4 Drawing Sheets

(51) Int. Cl.
  *B65G 57/03* (2006.01)
  *B65G 57/24* (2006.01)
  *B65G 65/02* (2006.01)

(52) U.S. Cl.
  CPC .. *B65G 2207/14* (2013.01); *B65G 2814/0313* (2013.01)

(58) Field of Classification Search
  USPC ............ 414/277, 279, 281, 282, 564, 744.3, 414/792.9, 793, 799; 901/21, 25, 8
  See application file for complete search history.

(56) References Cited

U.S. PATENT DOCUMENTS

| | | | | | |
|---|---|---|---|---|---|
| 3,403,799 | A | * | 10/1968 | Sindzinski | B65G 47/57 198/435 |
| 4,055,257 | A | * | 10/1977 | Krebs | B31B 1/98 198/469.1 |
| 4,162,016 | A | * | 7/1979 | Schmitt | B65G 57/035 198/748 |
| 4,205,934 | A | | 6/1980 | Pantin et al. | |
| 4,616,782 | A | * | 10/1986 | Marietta | B05B 13/0405 118/323 |
| 4,867,299 | A | * | 9/1989 | Fukuoka | B65G 47/643 198/435 |
| 5,100,284 | A | * | 3/1992 | Boisseau | B25J 9/0084 414/744.3 |
| 5,284,252 | A | * | 2/1994 | Bonnet | B07C 3/04 198/786 |
| 5,348,440 | A | * | 9/1994 | Focke | B65G 61/00 414/792.9 |
| 5,470,193 | A | * | 11/1995 | Miura | B23Q 7/1447 414/331.04 |
| 5,498,122 | A | * | 3/1996 | Miura | B23P 19/001 414/788.7 |
| 5,758,471 | A | * | 6/1998 | Denley | B65B 35/50 53/399 |
| 6,230,872 | B1 | * | 5/2001 | Huang | B07C 3/02 198/368 |
| 6,231,298 | B1 | * | 5/2001 | Heston | B65G 57/06 198/468.2 |
| 6,533,533 | B1 | * | 3/2003 | Heston | B65G 57/24 414/791.6 |
| 8,257,011 | B2 | * | 9/2012 | Pierson | B65G 57/24 198/430 |
| 2003/0185656 | A1 | * | 10/2003 | Hansl | B66F 9/07 414/277 |
| 2005/0095114 | A1 | * | 5/2005 | Jenkins | B65G 57/302 414/788.1 |
| 2007/0140817 | A1 | * | 6/2007 | Hansl | B66F 9/063 414/277 |
| 2011/0277423 | A1 | * | 11/2011 | Magri | B65G 57/035 53/443 |
| 2013/0160403 | A1 | | 6/2013 | Petrovic | |

FOREIGN PATENT DOCUMENTS

| | | | | |
|---|---|---|---|---|
| DE | 2841195 A1 | | 3/1980 | |
| DE | EP 0257447 A2 | * | 3/1988 | ............ B65G 57/06 |
| DE | 4238341 A1 | | 5/1993 | |
| DE | 4307220 A1 | | 10/1993 | |
| DE | 102012204030 A1 | | 9/2013 | |
| EP | 1 908 709 A1 | | 9/2008 | |
| EP | 2537783 A1 | | 12/2012 | |
| EP | 2 610 197 A1 | | 3/2013 | |
| EP | 2610197 A1 | | 7/2013 | |
| FR | WO 2013038102 A1 | * | 3/2013 | ............ B65G 57/24 |
| IT | MI941558 A1 | * | 1/1996 | ............ B65G 57/06 |
| IT | MI941558 A1 | | 1/1996 | |

OTHER PUBLICATIONS

European Search Report dated Apr. 21, 2015 for EP 14 19 2692.
Chinese Office action for CN2014107190172 dated Apr. 26, 2016.

* cited by examiner

PALLETIZING DEVICE AND METHOD FOR HANDLING THEREOF

This invention relates to a palletizing device with vertically mobile transfer and loading stations, as well as a method for handling such a palletizing device.

For the palletizing of groups or layers of items, packaged goods, or packages, the items, packaged goods, or packages normally first pass through a grouping station where the items, which are initially transported one after another in one or more rows are displaced and/or put together into palletizable layers. Such palletizable layers must be delivered to an appropriate loading station capable of performing lifting movements. The loading station then deposits said item layers at a desired location, e.g. at a so-called stacking position, and a pallet located thereon. In order to allow for the layers or groups of items, packaged goods, or packages to be handed over from a horizontal conveying equipment to the loading station at the correct height, a so-called transfer station is usually placed upstream thereof, from which the layers or groups to be dropped are handed over individually to the loading station which will then ensure palletizing.

Both the transfer station and the loading station respectively include base surfaces or base planes, on which the grouped items, packaged goods, and/or packages are displaced. In a base surface of the loading station, e.g. made of two parts, the base surface consists of two support trays or so-called loading plates, which are closed in the loading state and then opened during the delivery or depositing phase for depositing the item layer at a stacking position or on a pallet. A person skilled in the art is aware of numerous variants for such purposes, such as shutter gripper heads or - the like, for example. In this case, such a palletizing method is performed with a palletizing device known from prior art so that initially, items are put together by means of a grouping device into a palletizable layer and thereafter delivered from a pick-up position or a pick-up station or a so-called transfer station to the loading station. To this end, it is necessary for the loading station, such as a shutter gripper head arranged for example on a lifting gear or else a robot, to adjoin the pick-up position or the transfer station so that delivery of the item layer into the loading station can take place. Herein, the shutter gripper head or the loading station stays in place until the layer has been delivered completely from the pick-up or transfer station into the loading station. Once the item layer is located completely inside the loading station, the loading station positions the item layer at a desired handover position, usually on a pallet provided at a stacking position, by horizontal and/or vertical movements. Thereafter, the same procedure is repeated until the desired number of layers has been deposited onto the pallet.

From EP 1 908 709 A1, a method and a device for receiving and transferring packages is known. The device has a support tray for the packages with an open face for introducing the packages. A mobile slider is used for shifting the packages along a horizontal receiving direction through the open face.

EP 2 610 197 A1 further discloses a very compact palletizing device in which, on a single lifting column, a vertically mobile transfer station and, downstream thereof in the conveying direction, a vertically mobile loading station for supplying a stacking position with item layers are arranged. At an upper front of the lifting column, two drive motors are placed, which may ensure the vertical actuating movements of the transfer and loading stations by means of pulling straps. The vertical guide free of play of both stations is respectively formed by guide blocks which may slide up and down at a front guide rail pair of the lifting column. As the guide block of the transfer station is arranged below the guide block of the loading station, the loading station cannot be lowered under the height level of the transfer station. The disclosed palletizing device is thus exclusively adapted for item supply with the feed located at the bottom.

A major objective of the present invention is to provide a palletizing device which is as compact as possible and provides increased degrees of freedom of motion over known palletizing devices and thus more universal and broader possible applications and implementations for various operational and conveying scenarios. Another objective of this invention is the ability to increase palletizing speed in handling of such a palletizing device. In particular, the method is to allow for minimization of the periods between depositing of an item layer and receiving of another item layer.

In order to achieve the objective mentioned first, the invention suggests a palletizing device having the features of independent claim 1 which comprises at least one vertically mobile transfer station as well as a vertically mobile loading station. Features of advantageous developments of the invention can be found in the dependent claims. The vertically mobile transfer station of the inventive palletizing device is in conveying communication with upstream conveying equipment for conveying items, packaged goods, packages, or the like to be palletized. Such conveying equipment can in particular be some horizontal conveying equipment, such as a mat chain conveyor or the like, for example, conveying a plurality of items, packages, or similar packaged goods to the transfer station and transferring them to the same. The transfer station has a base plane of defined dimension for a given number of items, packages, or packaged goods, which usually have already been put into spatial arrangements which can be palletized and stacked upon each other by means of the downstream loading station. Moreover, the inventive palletizing device includes an also vertically mobile loading station downstream of the transfer station in the conveying direction, which is in conveying communication with a stacking position for palletizing the items, packaged goods, and/or packages.

According to the invention, the transfer and loading stations, which can be adjusted in the vertical positions thereof independently from each other, are associated with a common support structure. On the one hand, this common support structure is used as a suspension bracket and support bearing for the vertically adjustable transfer and loading stations and, on the other hand, it has suitable guide devices in order to enable said vertical adjustability with the desired speed and precision. For this purpose, separate guide devices are provided, e.g., in the form of guide or guard rails or the like, anchored vertically along the bearing or support structure, for vertically and movably guiding the transfer and loading stations. Such separate guide devices or the separate guide or guard rails are spatially and functionally separated from each other so that separate height adjustability of the transfer station and the loading station can be ensured under all operating conditions. Moreover, the bearing or support structure has separate drive devices associated therewith for vertical position adjustment of the transfer and loading stations, e.g. in the form of separate drive motors which can ensure the exactly controllable height adjustability of the transfer and loading stations, e.g. via appropriate pulling means.

In the inventive palletizing device with its vertically mobile transfer station and its also vertically mobile loading station downstream of the transfer station in the conveying direction, provision can be made preferably for both vertically mobile stations with their base planes for the items, packages, or packaged goods to be transported and palletized, to be indeed arranged directly next to each other and thus to be in variably usable conveying communication with each other, but remaining adjustable independently from each other in their vertical positions. According to the invention, this is achieved by both stations, the transfer and the loading station, being associated with a common, stationary support structure, which is typically not rotatable about its axis. On this support structure, which can be formed by a lifting column, for example, preferably separate guide devices for vertically mobile guiding as well as separate drive devices for vertical position adjustment of the transfer and loading stations are arranged, respectively. Furthermore, such guide devices anchored on the support structure or the lifting column or integrated therein are preferably respectively arranged on opposite sides of the support structure, which can be achieved, e.g., by vertical guides and/or guide devices for the vertical movements of the transfer and loading stations respectively located on opposite vertical side walls of the support structure.

As in the inventive palletizing device, the transfer and loading stations arranged next to each other are preferably associated with vertical guides and/or guide devices for the vertical movements of the transfer and loading stations respectively arranged opposite on the support structure, they can move up or down largely independently from each other, appropriately while adequately conveying the items, packaged goods, or packages towards the stacking position. Thus, the transfer station can be positioned in the lifting or lowering movements thereof above or below the height level of the at least temporarily immobile or vertically moving loading station. Likewise, the loading station can also be positioned in the lifting or lowering movements thereof above or below the height level of the at least temporarily immobile or vertically moving transfer station. I.e., both stations, which are arranged consecutively and/or in series in the direction of conveyance or material flow of the items, packaged goods, and/or packages conveyed towards the stacking position, may overtake each other as required, thus being controllable independently from each other in their vertical movements, which is made possible not least by the separate vertical guides and the separately made and/or controllable drive motors.

The bearing or support structure of the inventive palletizing device can be formed in particular by a column-like structure, in particular by a lifting column, substantially extending in the vertical direction and anchored at the bottom front thereof to the floor of the production facility. On this lifting column, said transfer and loading stations can be arranged to be vertically mobile while preferably being mobile independently from each other so that no collision of the transfer and loading stations may occur and the vertical movements thereof are in no way dependent on each other except for the equality of levels of the base planes of both stations required for the loading operation of the items, packaged goods, or packages. In order to allow for vertical mobility of the transfer and loading stations, they can respectively be fitted with separate drive motors, which can be arranged on a top side of the support structure or lifting column, for example. Both the transfer station and the loading station can be connected by the respective drive motors thereof, e.g. via suitable pulling means, so that they can be pulled up or let down by means of the pulling means—which can be e.g. pulling straps, pulling chains, pulling cables or the like—against the effect of gravity.

In order to reduce the required drive power for vertical movement of the transfer and loading stations, the stations can be coupled respectively with counterweights which can respectively descend or rise in an opposite vertical movement with respect to the loading or transfer stations moving up or down. Again, such counterweights can optionally be connected to the drive motors or the loading or transfer stations via corresponding pulling means, such as pulling straps, pulling chains, or pulling cables, for example. Optionally, the vertical drive, i.e. the drive of the lifting and lowering movements of the loading and transfer stations can also take place by means of suitable linear motors, such as for example hydraulic drives, by means of electric rack-and-pinion drives or the like. Also, in such a variant, respectively separate drives are required both for the loading station and the transfer station.

Designated in this context as the guide devices of the inventive palletizing device are respectively connecting members between the loading station and the transfer station, on the one hand, and the supporting structure or lifting column, on the other hand. Such connecting members allow for the vertical movements of the two vertically adjustable loading and transfer stations and moreover ensure a limitation of the possible movements within a specified moving space. Such connecting members or guide devices can be formed e.g. respectively by roller and/or slide bearing-mounted vertical guide members which are guided on guide rails and/or surfaces extending vertically along or in parallel to the longitudinal direction of the lifting column on opposite side walls of the support structure or lifting column. By allowing for vertical adjustability independently from each other, these at least two vertical guide members provide the inventive functional and spatial separation of the loading and transfer stations. The vertical guide members require at least one bearing and guide at two or three spaced apart positions, wherein it has to be substantially ensured that the guides are spatially determined and do not allow for any undefined movements of the transfer or loading stations. The guides can respectively be fitted with suitable roller bodies, optionally also with slides. Preferably, the vertical guide members respectively comprise at least three sliding and/or roller bearing guides which enclose a guide rail extending in parallel to the vertical longitudinal direction of the support structure or lifting column at least on two sides so that an unambiguous specification of the degrees of freedom of motion is defined with exclusively vertical possible movements of the guide members.

While the vertical guide members, to which the loading or transfer stations are fastened, respectively, are preferably arranged on opposite vertical side surfaces of the support structure or lifting column, respectively, the base surfaces of the loading and transfer station preferably respectively project forward, in the area of a face of the support structure or lifting column, so that the base surfaces of the vertically adjustable loading and transfer stations, with the lifting column being placed on the edge side in a conveyor path, can form part of the conveying section for conveying the items, packaged goods, or package layers, when they are palletized in complete layers. As mentioned above, the transfer and the loading station are arranged next to each other in the conveying direction so that they are consecutively supplied in the conveying direction with items, packaged goods, or packages which can eventually be deposited and palletized at the stacking position by means of the loading station.

The vertically adjustable transfer station can optionally have a suitable pushover device in order to push the layer to be palletized with items, packaged goods, or packages in the horizontal direction onto the loading station located in the same plane. However, the base plane of the transfer station is preferably fitted with horizontal conveying equipment, which may consist for instance of a continuous belt, a mat chain, or the like, i.e. by a continuous conveying means which may ensure fast and vibration-free transport of the layer to be palletized to the downstream conveying means or loading station. In addition, the loading station can be fitted with retractable floors, a two-part floor, surface, or the like, wherein the side of the floor surface oriented towards the transfer station can preferably travel downwards so as not to hinder the transfer movement of the layer. The loading station can be embodied as a so-called shutter head, shutter gripper head, or the like, for example, having a two-part floor surface with rotating base rods. Also, the possible movement of the at least two-part floor surface offers the advantage that simply by closing the shutter, a package layer can be handed over from the transfer station to the loading station.

Thereby, the pushover operation can be optimized in that the layers of packages, packaged goods, items, or packages, transferred from the transfer station to the loading station, can be pushed over simply during a closing operation of the two or multiple part floor surface of the loading station. For this purpose, e.g. a shutter-like portion of the two or multiple part floor surface of the loading station, which is oriented towards the transfer station, can be conveyed under the base plane, while another shutter-like portion of the two or multiple part floor surface of the loading station, which is oriented away from the transfer station in the conveying direction, can be conveyed to a higher level, i.e. above the base plane. Thereby, the next pushover operation can already be started during a closing operation of the base shutter of the loading station.

The wide and flexible vertical adjustment range of the transfer station, which can be height-adjusted independently from the loading station, allows for different arrangements of the conveying equipment which can have a so-called bottom feed or a so-called top feed depending on the machine environment. The top and bottom feed designate different height levels of horizontal conveying devices for supplying items, packages, or packaged goods, which can be arranged e.g. above a lowest vertical position of the transfer station. With a bottom feed, the lower vertical position of the transfer station and the conveying level of the conveying equipment are normally at a uniform height level.

One essential advantage of the inventive palletizing device is that in spite of using a single common support structure—which can be in particular a vertical lifting column or the like—and in spite of the transfer station and loading station being arranged in close proximity to each other, a completely independent vertical movement of both stations is possible. These independent possible movements are obtained essentially by the guide elements for the vertical guidance of the two stations respectively being embodied separately and thus both functionally and constructionally separated from each other. The guide elements can indeed be arranged on opposite side walls of the same lifting column and thus arranged in direct constructional proximity to each other, but still remain constructionally separate and separated also in the guided movements thereof and on the drive side.

Moreover, for achieving the above-mentioned further objective, this invention includes a method for handling a palletizing device according to any of the previously described alternative embodiments. As mentioned above, the palletizing device comprises a vertically mobile transfer station as well as loading station which is placed downstream and vertically mobile independently therefrom, wherein the transfer station is in conveying communication with upstream conveying equipment for conveying items, packaged goods, packages, or the like, to be palletized, while the loading station is in conveying communication with a stacking position for palletizing the items, packaged goods, and/or packages. In the method, provision is made for the base planes of the transfer and loading stations to be approximately flush with each other at least when a layer of items, packaged goods, and/or packages is pushed over between both stations. Furthermore, provision can be made for the transfer and loading stations to perform synchronous vertical movements, respectively, at least during a phase of pushing over a layer of items, packaged goods, and/or packages between both stations, which may significantly accelerate a pushover operation, as a lifting movement of both stations in the same direction can already be started upon receipt of a complete layer of items, packaged goods, and/or packages from the horizontal conveying equipment onto the transfer station, namely even during a pushover operation from the transfer onto the loading station. Thereby, a height level to be approached in order for the stacking position to be reached exactly and the layer of items, packaged goods, and/or packages to be deposited can be reached faster, which may accelerate the entire palletizing process.

In addition, the pushover operation can be optimized in that the layers of packages, packaged goods, items, or containers transferred from the transfer station onto the loading station, can already be pushed over during a closing operation of the two or multiple part floor surface of the loading station, which is ensured by the two or multiple part configuration of the base shutter having an approximately centered separating edge. Furthermore, this pushover operation—optionally with a simultaneous shutter movement—can be performed during an approximately synchronous up or down movement of the transfer and loading stations respectively moved synchronously up and down at the lifting column.

Hereafter, essential ones of the already mentioned aspects of this invention as well as others will be presented in summary. Thus, the palletizing device according to the invention provides a single lifting column in which the transfer station and the loading station are spatially placed on the same side, but wherein the drive of both stations is arranged oppositely on the column. Thus, the deflecting axes for the pulling means for the vertical movements of the individual stations are orthogonal to the transport flow of the package layers from the transfer station into the loading station, respectively. Due to this design and the arrangement of the drives, it is possible to use the palletizing device flexibly both for a so-called top package layer feed and for a so-called bottom package layer feed. This configuration is also enabled in that the transfer station and the loading station can overtake each other regarding the height position thereof. To this end, the transfer station and the loading station are respectively driven or operated via their own drives, pulling means, and counterweights. The handover of an item layer from the transfer to the loading station can take place as required and advantageous also during synchronized lifting gear movements in the same direction. Preferably, the transfer station comprises a continuous conveying means, while the loading station preferably comprises a two-part floor surface, e.g. a shutter or the like. Herein, it should be taken into consideration that the shutter half which is spatially associated with or oriented towards the transfer station, is removed downwards. This offers the advantage that a package layer can already be handed over from the transfer station into the loading station when the shutter is closed.

The bearing and guide of the transfer station or loading station can optionally be a so-called three-point bearing, respectively.

By means of this design, in spite of being arranged on a lifting column, the loading station and the transfer station may overlap vertically regarding the movements thereof, which is a significant progress over known palletizing devices.

Hereafter, sample embodiments of the invention and the advantages thereof will be illustrated more in detail by means of the appended figures. In the figures, the proportions of the individual items with respect to each other do not always match the real proportions as for the sake of clarity, some shapes have been simplified and other shapes have been enlarged with respect to other items.

FIG. 1c shows a schematic side view of the palletizing device according to FIG. 1a.

FIG. 1d shows a schematic top view of the palletizing device according to FIG. 1a.

For the same or similarly acting elements of the invention, respectively the same reference numerals are used. Furthermore, for the sake of clarity, in the individual figures only reference numerals are represented which are required for the description of the respective figure. The represented embodiments are merely illustrative of how the device according to the invention or the method according to the invention can be configured and do not imply any exhaustive limitation.

The total of four schematic views of FIG. 1 show alternative embodiments of an inventive palletizing device 10 comprising a lifting column 12 with a transfer station 14 and loading station 16 vertically mobile thereon. Thus, FIG. 1a shows a schematic perspective view of the palletizing device 10, while FIG. 1b illustrates guide members for vertical mobility of the transfer and loading stations 14, 16 along a longitudinal direction of the lifting column 12. FIG. 1c shows a schematic side view and FIG. 1d a top view of the palletizing device 10.

Figure 1A:
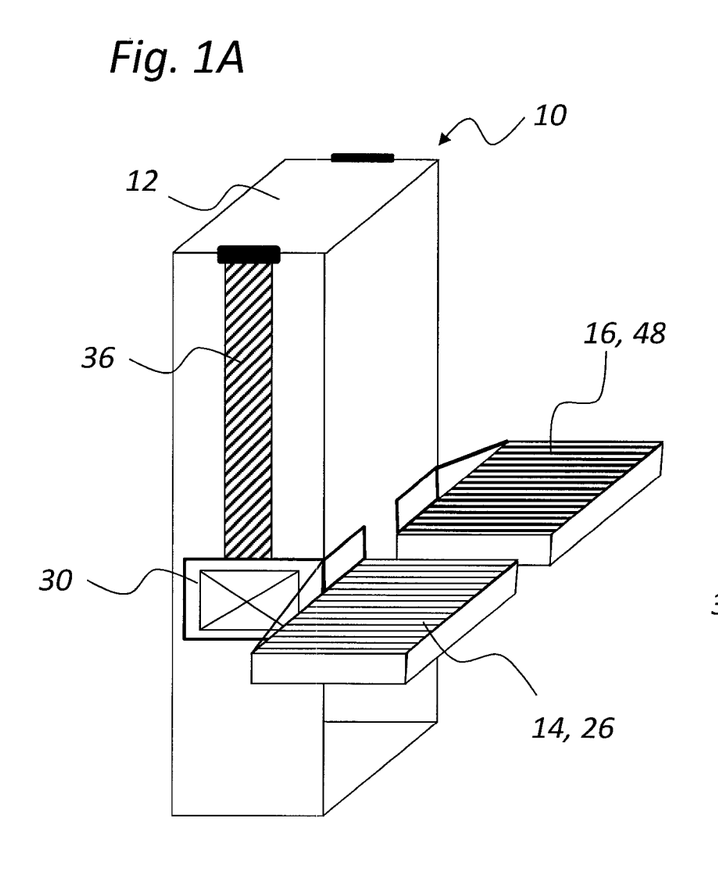
FIG. 1a shows a schematic perspective view of an alternative embodiment of an inventive palletizing device including a lifting column with a transfer station and loading station vertically mobile thereon.
Figure 1B:
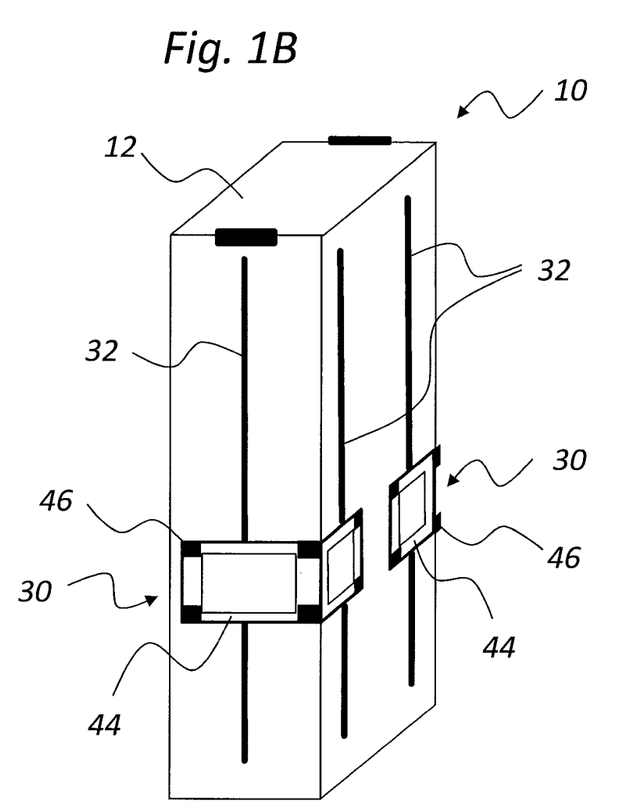
FIG. 1b shows another schematic perspective view for illustrating guide members for vertical mobility of the transfer and loading stations along a longitudinal direction of the lifting column.
Figure 1C:
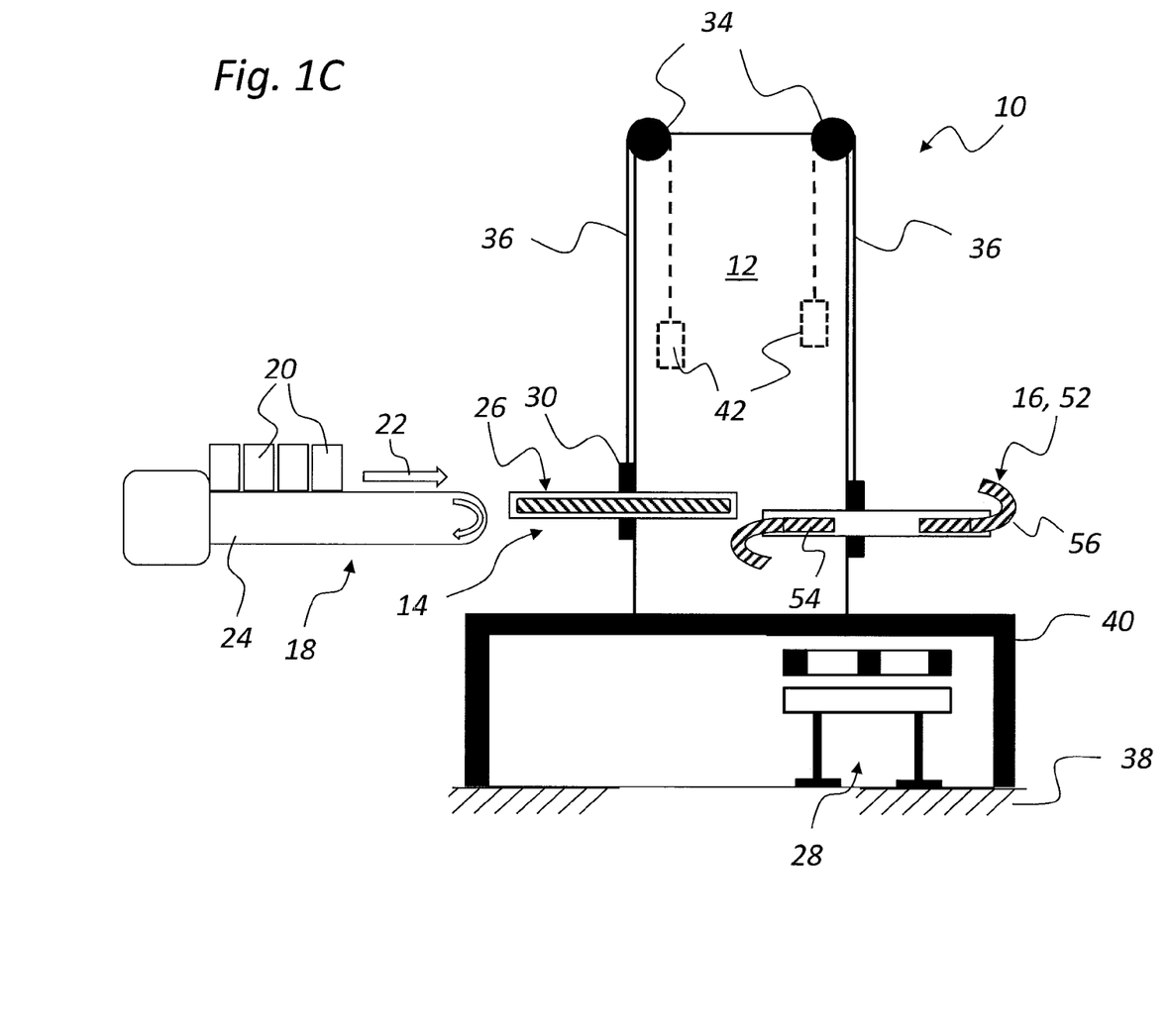

As apparent in particular from FIGS. 1a and 1c, arranged on the vertically aligned lifting column 12 of the palletizing device 10 are the vertically mobile transfer station 14 as well as the loading station 16 which is also vertically mobile. The vertically mobile transfer station 14 has associated therewith conveying equipment 18 for horizontal conveying of packages 20 to be palletized (cf. FIG. 1c) which are conveyed to the transfer station 14 in the conveying direction 22 and respectively transferred in the form of layers. The conveying equipment 18 shown can in particular be some suitable horizontal conveying equipment 24, such as e.g. a mat chain conveyor or the like, conveying and transferring a plurality of packages 20 to the palletizing device 10 or the transfer station 14 thereof.

In this context, if packages 20 are mentioned in general, then this is to be merely illustrative. In principle, the palletizing device 10 is suitable for palletizing a wide variety of items, packaged goods, or packaging goods. For the sake of simplicity, in the following, the term package 20 will be used throughout, but without excluding suitability for other items or packaged goods.

Figure 1D:
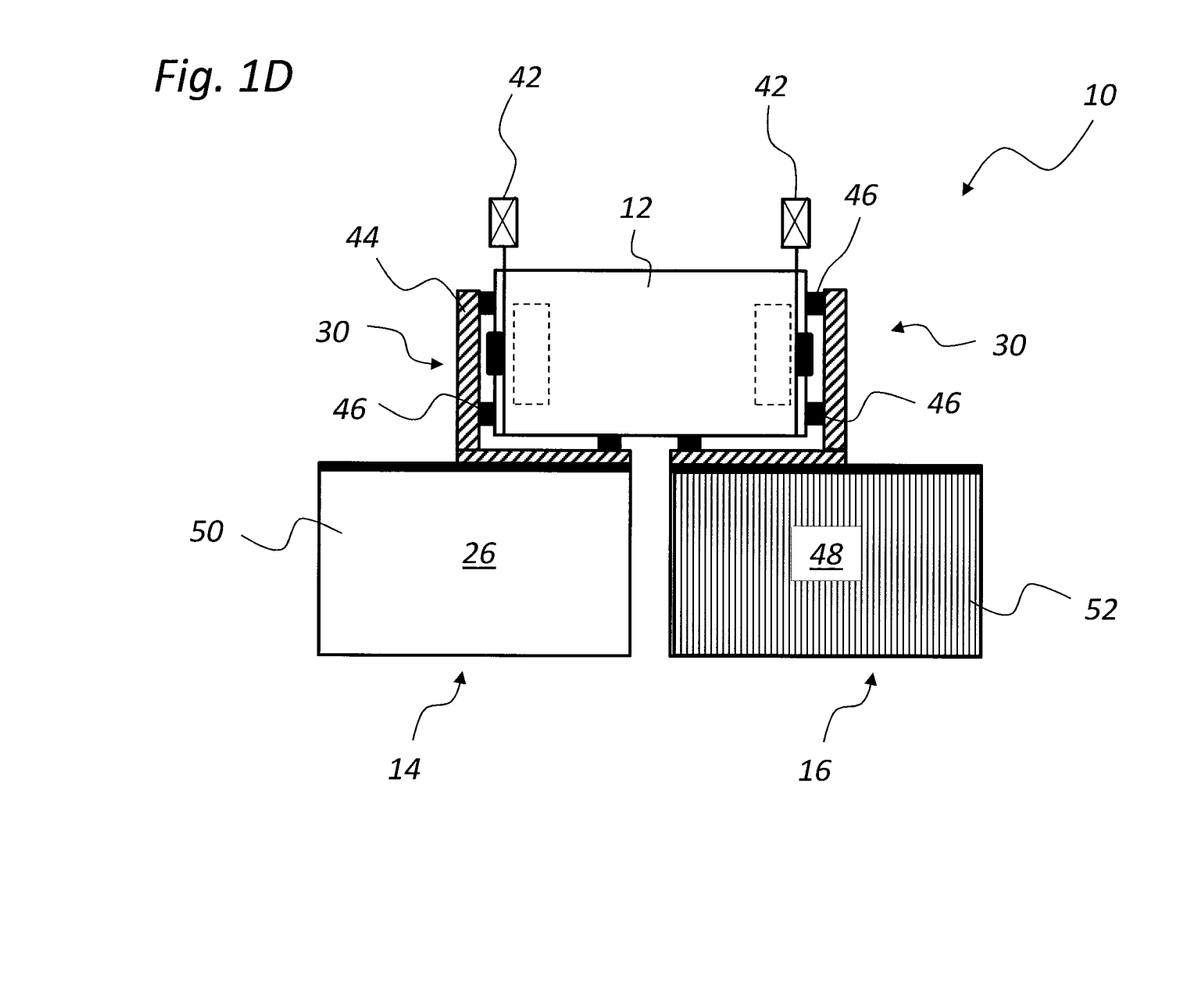

As apparent in particular from FIGS. 1a, 1c, and 1d, the transfer station 14 has a first base plane 26 of defined size for a certain number of packages 20 which usually have already been placed in spatial arrangements and which can be palletized and stacked upon each other by means of the downstream loading station 16, possibly in several layers upon each other. Downstream of the transfer station 14 in the conveying direction 22, the vertically mobile loading station is placed, which is in conveying communication with a stacking position 28 (FIG. 1c) for palletizing the packages 20.

The transfer and loading stations 14 and 16, which are adjustable independently from each other regarding the vertical positions thereof, are associated with a common support structure consisting of the lifting column 12 in the sample embodiment shown. The common support structure of the lifting column 12 is used as a suspension bracket and bearing for the vertically adjustable transfer and loading stations 14, 16 and has to this end vertically mobile guide devices 30 (cf. FIG. 1b) which allow for vertical adjustability with the desired speed and lack of play. The separate guide devices 30, on which the loading station 16 or the transfer station 14 is anchored, respectively, allow for vertical mobility by means of guide rails 32 extending along the bearing or support structure of the lifting column 12 (FIG. 1b). Such separate guide devices 30 as well as the separate guide rails 32 are respectively separated spatially and functionally from each other, whereby the desired separate height adjustability of the transfer station 14 and the loading station 16 is ensured.

The schematic side view of FIG. 1c illustrates the separate drive motors 34 arranged at a top front of the lifting column 12, which are used for vertical position adjustment of the transfer and loading stations 14 and 16 and for this purpose are connected therewith via adequate pulling means, in particular by pulling straps 36, so that precisely controllable height adjustability of the transfer and loading stations 14 and 16 is ensured. The lifting column 12 can preferably be anchored by the lower front thereof in the floor of a production facility or a packaging line area. Optionally, the lifting column 12 can stand on an additional platform, a base 40, or the like, and be anchored there.

The schematic top view of FIG. 1d clearly shows the functional and spatial separation of the transfer and loading stations 14 and 16 arranged directly adjacent to each other, so that the transfer and loading stations 14 and 16 cannot collide and the vertical movements thereof are not dependent of each other in any way, except for the equality of levels of the base planes of both stations 14 and 16 which is required for the loading operation of packages 20. By means of the pulling means or pulling straps 36, both stations 14 and 16 can be raised against the effect of gravity or lowered.

In order to reduce the required driving power for vertical movement of the transfer and loading stations 14 and 16, the stations 14 and 16 are coupled with counterweights 42, respectively, which can drop or rise, respectively, in an opposite vertical movement to the loading or transfer stations 16 and 14 moving up or down. Also, the counterweights 42 can optionally be connected by adequate pulling means, such as pulling straps, pulling chains, or pulling cables, for example, to the drive motors 34 or the loading or transfer stations 16 and 14. In the sample embodiment shown, the counterweights 42, which are vertically mobile in the opposite direction of the transfer and loading stations 14 and 16, are located at a rear side of the lifting column 12, on a side located opposite the stations 14 and 16.

The schematic partial view of FIG. 1b and the top view of FIG. 1d show the structure of the guide devices 30, which are respectively formed by L-shaped support or frame members 44, respectively establishing a connection between the loading station 16 or the transfer station 14, on the one hand, and the support structure or the lifting column 12, on the other hand. The L-shaped support or frame members 44 enable the vertical movements of the two vertically adjustable loading 14 and transfer stations 16 and also provide a limitation of the possible movements within a predefined range of movement. In the sample embodiment shown, the frame members 44 respectively have three pairs of roller bearings 46 associated therewith, which are guided in the vertical direction along the guide rails 32 on the sides or at the front of the lifting column 12.

As illustrated in FIG. 1b, each of the two stations 14 and has a separate L-shaped frame member 44 associated therewith, having in total at least three roller bearing pairs 46 so that vertical guiding is possible on one guide rail pair 32, respectively. Each roller bearing pair 46 has at least two roller bearings 46 which are vertically spaced apart and respectively guided on a guiding rail 32 or rolling thereon. As the L-shaped frame member 44 has at least three such roller bearing pairs 46 in total, it can be guided and fixed without play, as at least one roller bearing pair 46 is associated with the front side of the lifting column 12, and at least one other roller bearing pair 46 is associated with the vertical side surface of the lifting column 12 (cf. FIG. 1b) so that the lifting column 12 is enclosed by at least two sides. On these two frame members 44, the transfer station 14 or the loading station 16 is anchored, respectively, thereby enabling the independent vertical movements of both stations 14 and 16.

As apparent in particular from FIGS. 1a and 1d, the vertical guide devices 30 in the form of frame members 44, on which the loading or transfer stations 16 or 14 are fastened, respectively, are arranged on opposite vertical side surfaces as well as at the vertical front of the lifting column 12, respectively, so that the first base plane 26 of the transfer station 14 and the second base plane 48 of the loading station arranged directly adjacent thereto respectively protrude forward, so that the base surfaces or base planes 26 and 48 of the vertically adjustable loading and transfer stations 16 and 14, with the lifting column 12 being placed on the edge side at the conveying equipment 18, can form part of the conveying portion, respectively, for conveying the package layers 20 when they are palletized in complete layers.

For the layer with packages 20 to be palletized, which is located on the first base plane 26 of the transfer station 14, to be pushed in the horizontal conveying direction 22 onto the second base plane 48, located at the same height, of the loading station 16, in the sample embodiment shown, the first base plane 26 of the transfer station 14 is fitted with a continuous conveying means 50, which may be formed in particular by a continuous belt, a mat chain, or the like, so that the continuous conveying means 50 can provide for fast and vibration-free transport of the package layer 20 to be palletized to the downstream loading station 16. In addition, the loading station 16 can be fitted with a two-part floor surface 52, wherein the first floor surface half 54 oriented towards the transfer station 14 can preferably be moved downwards below the second base plane 48 so as not to interfere with the transfer movement of the package layer 20.

According to FIG. 1c, the second floor surface half 56 of the floor surface 52 of the loading station 16, divided transversely to the conveying direction 22, can be optionally opened upwards via the base plane 48. In order to allow for such opening movements of the floor surface 52 for delivery of the package layer 20 standing thereon downwards onto the stacking position 28, the loading station 16 can preferably be embodied by a so-called shutter head having a two-part floor surface 52 with rotating base rods. In this case, the movement capability of the two-part floor surface 52 offers the advantage that upon closing of the shutter, another package layer 20 can already be handed over from the transfer station 14 to the loading station 16, once a previous package layer 20 has been deposited at the stacking position 28.

Figure 2A:
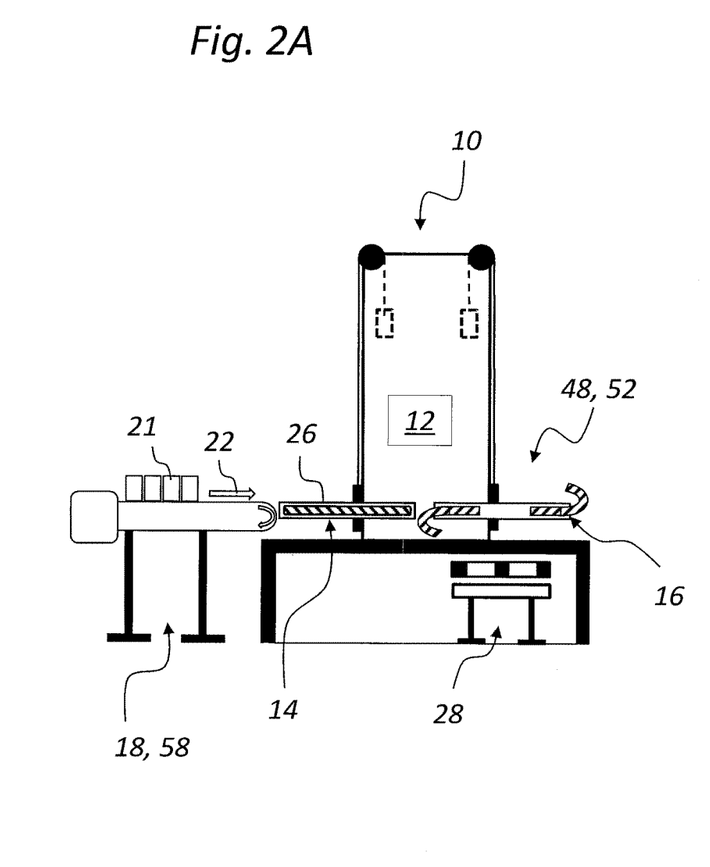
FIG. 2a shows a first alternative embodiment of the inventive palletizing device with admission located at the bottom for items, packaged goods, and/or packages to be palletized.
Figure 2B:
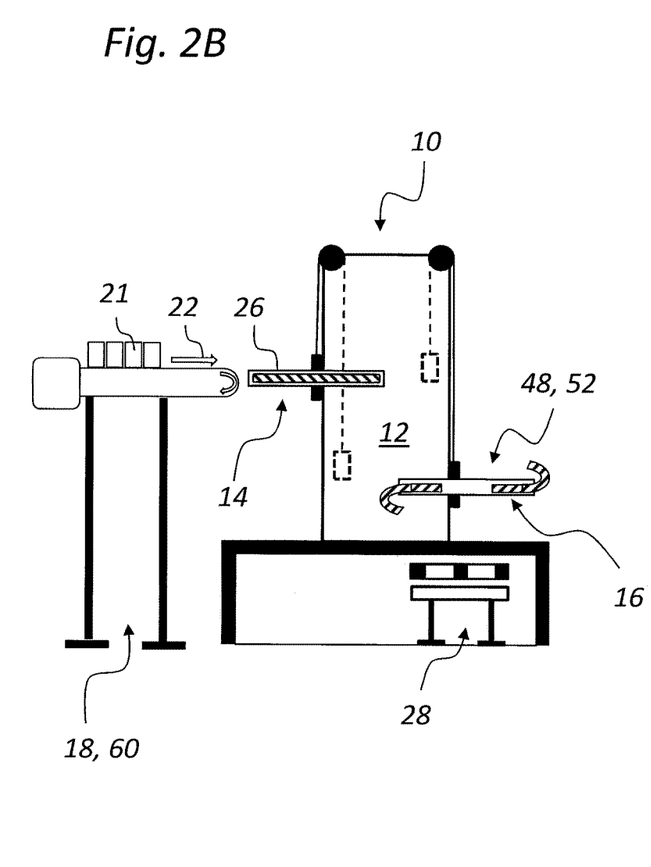
FIG. 2b shows a second alternative embodiment of the inventive palletizing device with admission located at the top for items, packaged goods, and/or packages to be palletized.

The two schematic side views of FIG. 2 illustrate the universal usability of the inventive palletizing device 10, which is suitable both for a so-called bottom feed 58 of the conveying equipment 18 (FIG. 2a) and a so-called top feed 60 of the conveying equipment 18 (FIG. 2b). In this respect, the bottom feed 58 designates a height level of the conveying equipment 18 which is approximately in the range of the height level of the stacking position 28 not yet supplied with package layers. Correspondingly, top feed 60 designates height level of the conveying equipment 18 which is located significantly above the height level of the stacking position 28 not yet supplied with package layers 21. I.e., with bottom feed 58, normally the lower vertical position of the transfer station 14 and the conveying level of the conveying equipment 18 are on a uniform height level, while with the top feed 60 it may be required for the upper vertical position of the transfer station 14 to be located above the conveying level of the conveying equipment 18, as a palletized stack at the stacking position 28 can definitely be higher than the height level of the conveying equipment 18. In this case, the loading station 16 which delivers its package layers 21 by opening the two-part floor surface 52 downwards must be lifted rather high. As the pushover of the package layer 21 between the transfer station 14 and the loading station 16 has to take place at a uniform height level, the transfer station 14 must thus also have a sufficiently broad vertical adjustment range.

While in the representation of FIG. 2a, a package layer 21 is lying on the conveying equipment 18 and is pushed over in the conveying direction 22 onto the transfer station 14 located at the same height level, and subsequently onto the loading station 16 flush therewith, in the representation of FIG. 2b, the transfer and loading stations 14 and 16 are located at different height levels. Thus, at the top feed 60 of the conveying equipment 18, a package layer 21 is ready to be pushed onto the adequately positioned transfer station 14. The loading station 16 arranged significantly lower may already have deposited a package layer 21 at the stacking position 28 and moved upwards while the transfer station 14 can be moved downwards in the opposite direction. As soon as both stations 14 and 16 have reached the same height level so that their base planes 26 and 48 are flush, the package layer 21 located on the transfer station 14 can be transferred onto the closed floor surface 52 of the loading station 16 by activation of the continuous conveyor means 50 of the loading station 14. Optionally, this pushover operation can also take place when the transfer and loading stations 14 and 16 are moved synchronously in the vertical direction, e.g. with the transfer and loading stations 14 and 16 simultaneously descending towards the stacking position 28. As soon as the package layer 21 has been completely transferred onto the loading station 16, the synchronous movement can end or the transfer station 14 can again be raised or lowered towards the conveying equipment 18 where another package layer 21 can be accepted.

In summary, the palletizing device 10 according to the invention offers the specific advantage that in spite of a single common support structure being used—which in particular can be the vertically aligned lifting column 12—and in spite of the transfer station 14 and the loading station 16 being arranged in close proximity to each other, a completely independent vertical movement of the two stations 14 and 16 is possible. Such independent movement capability is substantially achieved in that the guide members 30 for the vertical movement guide of both stations 14 and 16 are embodied separately, respectively, and thus are both functionally and constructionally separate from each other. In fact, the guide members 30 can be arranged on opposite side walls of the same lifting column 12 and thus in close constructional proximity to each other, but they are still constructionally separated as well as separated from each other on the drive side with regard to the movement guides thereof.

The invention was described with reference to a preferred embodiment. However, the person skilled in the art will appreciate that modifications or changes can be made to the invention without departing from the scope of protection of the appended claims.

REFERENCE LIST 10 palletizing device
12 lifting column
14 transfer station
16 loading station
18 conveying equipment
20 package, package layer
21 package layer
22 conveying direction
24 horizontal conveying equipment
26 first base plane
28 stacking position
30 guide device
32 guide rail
34 drive motor
36 pulling straps
38 bottom
40 base
42 counterweight
44 frame member
46 roller bearing, roller bearing pair
48 second base plane
50 continuous conveying means
52 two-part floor surface
54 first floor surface half
56 second floor surface half
58 bottom feed
60 top feed

The invention claimed is:

1. A palletizing device (10) with a vertically mobile transfer station (14) and with a vertically mobile loading station (16) downstream of the transfer station (14) in the conveying direction (22), in conveying connection with a stacking position (28) for palletizing items, packaged goods, and/or packages (20), and/or spatially associated with the stacking position (28), comprising: the transfer (14) and loading stations (16) arranged next to each other and adjustable in the vertical positions thereof independently from each other are associated with a common, fixed support structure, which has separate guide devices (30), respectively, for vertically mobile guiding and drive devices for vertical position adjustment of the transfer (14) and loading stations (16), wherein the support structure consists of a single lifting column (12) with substantially vertical longitudinal extension and having at least a front side and two opposing lateral sides, wherein the loading station (16) and the transfer station (14) are arranged next to each other at the front side, respectively, such that the vertical positioning of the loading station (16) does not interfere with the vertical movement of the transfer station (14), wherein a base plane (48) of the loading station (16) has a separable floor surface (52) comprising a first floor surface half (54) and a second floor surface half (56), wherein the guide devices (30) respectively comprise roller and/or slide bearing-mounted vertical guide or frame members (44) which are guided on corresponding, separate guide rails (32), each disposed on a corresponding side of the two opposing lateral sides of the lifting column (12), and wherein the vertical guide or frame members (44) comprise vertically adjustable slide members to which the loading station (16) and the transfer station (14) are secured, respectively, and wherein the vertical guide or frame members (44) are coupled to the respective loading station (16) and transfer station (14) only on a single, common side of each of the loading station (16) and transfer station (14).

2. The palletizing device (10) according to claim 1, wherein the transfer and loading stations (14, 16) arranged next to each other have associated therewith vertical guides and/or guide devices (30) arranged opposite, respectively, on the support structure, for the vertical movements of the transfer and loading stations (14, 16).

3. The palletizing device according to claim 2, wherein the transfer and loading stations (14, 16) arranged next to each other on the support structure are arranged behind one another and/or in line in the conveying or material flow direction of the items, packaged goods, and/or packages (20) conveyed towards the stacking position (28).

4. The palletizing device according to claim 1, wherein the support structure has separate drive motors (34) for the loading station (16) and the transfer station (14), respectively, as well as connecting members for lifting and lowering, respectively, in particular cable, chain, or belt sections (36).

5. The palletizing device according to claim 1, wherein each of the vertical guide members respectively comprises at least three slide and/or roller-bearing guides (46), enclosing on at least two sides a guide rail (32) extending in parallel to the vertical longitudinal direction of the lifting column (12).

6. The palletizing device according to claim 1, wherein a horizontal conveying device, in particular a continuous conveying means (50), is associated with a base plane (26) of the transfer station (14).

7. A method for handling a palletizing device (10) according to claim 1, comprising a vertically mobile transfer station (14) as well as a loading station (16) located downstream and vertically mobile independently therefrom, wherein the transfer station (14) is in conveying connection with upstream conveying equipment (18) for conveying items, packaged goods, packages (20), or the like, to be palletized, and wherein the loading station (16) is in conveying communication with a stacking position (28) for palletizing the items, packaged goods and/or packages (20), and wherein the base planes (26, 48) of the transfer (14) and loading stations (16) are approximately flush with one another, at least when a layer of items, packaged goods, and/or packages (21) is pushed over between the two stations (14, 16), and wherein the separable floor surface (52) is opened to deposit the layer of items, packaged goods, and/or packages (21) onto a stacking position (28) such that when the separable floor surface (52) is opened, the first floor surface half (54) moves downward below the base plane (48) of the loading station (16).

8. The method according to claim 7, wherein the transfer and loading stations (14, 16) respectively perform synchronous vertical movements, at least during a phase when a layer of items, packaged goods, and/or packages (21) is pushed over between the two stations (14, 16).

9. The method according to claim 7, wherein the transfer station (14) can be positioned in the lifting and lowering movements thereof above or below the height level of the loading station (16) which is at least temporarily immobilized or vertically moving.

10. The palletizing device according to claim 1, wherein the first floor surface half (54) is opposite the transfer station (14) in a downstream direction and is configured to moved downwards below the base plane (48) of the loading station (16) when the separable floor surface (52) is opened.

11. A palletizing device (10) with a vertically mobile transfer station (14) and with a vertically mobile loading station (16) downstream of the transfer station (14) in the conveying direction (22), in conveying connection with a stacking position (28) for palletizing items, packaged goods, and/or packages (20), and/or spatially associated with the stacking position (28), comprising: the transfer (14) and loading stations (16) arranged next to each other and adjustable in the vertical positions thereof independently from each other are associated with a common, fixed support structure, which has separate guide devices (30), respectively, for vertically mobile guiding and drive devices for vertical position adjustment of the transfer (14) and loading stations (16), wherein the support structure consists of a single lifting column (12) with substantially vertical longitudinal extension and having at least a front side and two opposing lateral sides, wherein the loading station (16) and the transfer station (14) are arranged next to each other at the front side, respectively, such that the vertical positioning of the loading station (16) does not interfere with the vertical movement of the transfer station (14), wherein a base plane (48) of the loading station (16) has a separable floor surface (52) comprising a first floor half (54) and a second floor surface half (56), wherein the guide devices (30) respectively comprise roller and/or slide bearing-mounted vertical guide or frame members (44) which are guided on corresponding, separate guide rails (32), each disposed on a corresponding side of the two opposing lateral sides of the lifting column (12), and wherein each of the vertical guide members respectively comprises at least three slide and/or roller-bearing guides (46), enclosing on at least two sides a guide rail (32) extending in parallel to the vertical longitudinal direction of the lifting column (12).

* * * * *